E. DAVIS.
INKSTAND.
APPLICATION FILED JAN. 30, 1913.
1,093,770.
Patented Apr. 21, 1914.
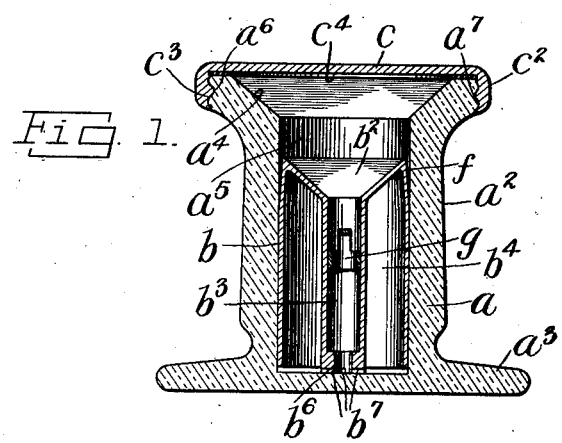
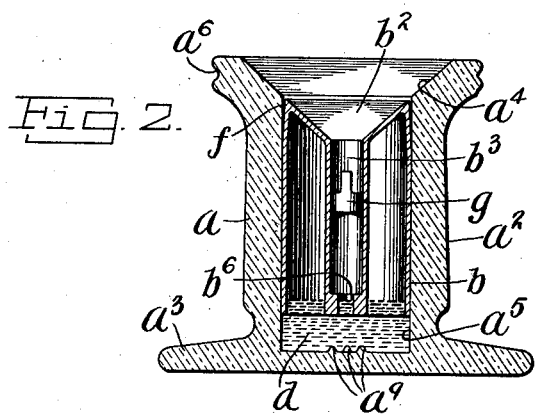
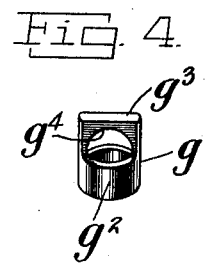
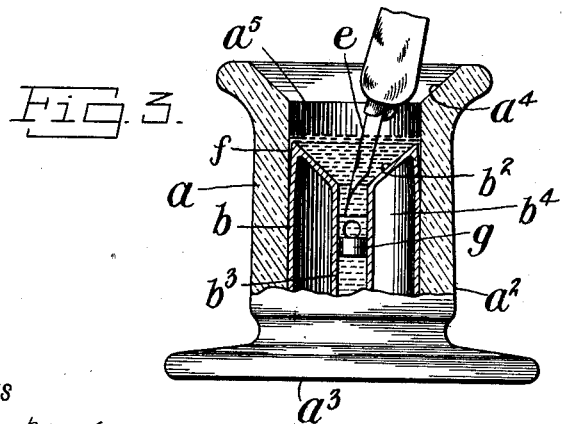
WITNESSES
INVENTOR
Emry Davis.
BY
ATTORNEYS

UNITED STATES PATENT OFFICE.

EMRY DAVIS, OF BROOKLYN, NEW YORK.

INKSTAND.

1,093,770. Specification of Letters Patent. Patented Apr. 21, 1914.

Application filed January 30, 1913. Serial No. 745,060.

*To all whom it may concern:*

Be it known that I, EMRY DAVIS, a citizen of the United States, and residing at Brooklyn, in the county of Kings and State of New York, have invented certain new and useful Improvements in Inkstands, of which the following is a specification, such as will enable those skilled in the art to which it appertains to make and use the same.

This invention relates to inkstands, and particularly to inkstands of the vertically movable plunger float class, such as that described and claimed in U. S. Letters Patent granted to me June 7, 1898, No. 605,177, and the object of this invention is to improve an inkstand of this class and to make the same more efficient and practical in use.

The invention is fully disclosed in the following specification of which the accompanying drawing forms a part, in which the separate parts of my improvement are designated by suitable reference characters in each of the views, and in which:—

Figure 1 is a central vertical section of my improved inkstand and showing the same provided with a detachable cover; Fig. 2 a view similar to Fig. 1, but with the cover removed and showing the ink in the stand and the operation of the plunger float when the ink is poured into the stand; Fig. 3 a view similar to Fig. 1, but showing the movement of the plunger float in the operation of inking a pen and showing also a modification in the form of the top of the inkstand; and Fig. 4 a perspective view of a part of the construction shown in Figs. 1 to 3 inclusive, detached.

In the practice of my invention I provide an inkstand comprising a main well, or receiver portion $a$ and a vertically movable plunger float $b$ mounted therein, and in the form of construction shown, the main receiver or well $a$ is provided with a removable cap or closure device $c$.

The main receiver or well $a$ comprises an upright body portion $a^2$ having a base $a^3$ and a funnel-shaped or cup-shaped top $a^4$, and the body portion $a^2$ is provided with a central vertical cylindrical chamber $a^5$ the bottom of which is closed but the top of which opens into the funnel-shaped or cup-shaped top $a^4$.

The body portion of the float $b$ is exactly cylindrical in form and the outer diameter thereof is approximately the same as the diameter of the chamber $a^5$, but said float is freely movable vertically in said chamber. The float $b$ is also tubular in form and provided with a funnel-shaped or cup-shaped top $b^2$ having a central tube $b^3$ which extends downwardly to or approximately to the bottom of the side walls of said float and forms, therein, an annular air chamber $b^4$. The tube $b^3$ is open at the bottom or provided with a vertically arranged port or passage $b^5$, and said tube is provided in the bottom thereof with a radial recess $b^7$, in the form of construction shown in Fig. 1, to permit ink poured into the top of the tube $b^3$ to pass out into the chamber $b^4$. The funnel or cup-shaped top $a^4$ of the body $a^2$ of the receiver is provided, in the construction shown in Figs. 1 and 2, with a rim portion $a^6$ threaded, as shown at $a^7$, and the cap, or closure device $c$ is provided with a rim $c^2$ having a corresponding thread $c^3$ and said cap, or closure device is also provided with a gasket $c^4$.

In the use of this inkstand, ink is poured into the top of the plunger float $b$ and flows down through the tube $b^3$ and out into the chamber $b^4$, as shown at $d$ in Fig. 2, and this operation continues until the plunger float $b$ rises into the position shown in said figure in which the funnel or cup-shaped top $a^4$ of the body $a^2$ of the receiver or well and the funnel or cup-shaped top $b^2$ of the plunger form a complete cup, and when the plunger reaches this position the pouring in of the ink is stopped and the device is ready for use.

In the operation of inking a pen, the pen is inserted into the top of the plunger float, as shown at $e$ in Fig. 3, and said plunger float is depressed and the ink which cannot rise in the chamber $b^4$ rises in the tube $b^3$ and into the cup-shaped top of the plunger float, as clearly shown in said figure, and when the pen is removed the plunger float again rises into the position shown in Fig. 2, and this operation may be repeated whenever necessary.

In the above described operation of depressing the plunger by means of the pen, in the operation of inking the pen, it may be that ink would be forced upwardly out of the tube $b^3$ and out of the inkstand, or onto the hand of the operator, especially if care is not used in the operation of depressing the plunger, and in order to prevent this result, I insert into the tube $b^3$ of the plunger a baffle device $g$ consisting of a short tube $g^2$ having a raised yoke-shaped member $g^3$ provided with a transverse recess or aperture $g^4$ which communicates with the central bottom of the short tube $g^2$. This baffle device is made so as to closely fit the tube $b^3$, and so that it may be adjusted therein to any desired extent or into any preferred position, and in addition to operating to prevent the too free rush of ink upwardly through said tube and out from the top thereof, as hereinbefore described, it will also serve to limit the extent to which the pen is inserted into said tube. In the upward movement of the ink through the baffle device $g$, the said ink passes first through the tube $g^2$ and then strikes the yoke-shaped top $g^3$ and is deflected laterally against the sides of the tube $b^3$, as will be readily understood, and this operation of the said baffle device will effectually prevent the upward rush of ink through the tube $b^3$ and the discharge thereof, as will also be readily understood, unless, the manipulation of the pen in the operation of inking the same is reckless or careless. The baffle device $g$ fits tightly in the tube $b^3$, but may be adjusted into any desired position therein by means of a wire rod or any suitable implement inserted through either end of said tube, whereby, said baffle device may be pushed or adjusted into the desired position, but, when once adjusted, the baffle device will not be moved in said tube by a pen point coming in contact therewith in the operation of inking a pen.

In the construction shown, the top of the plunger float is tapered slightly, as shown at $f$, so as to form a thin space between the same and the walls of the chamber $a^5$, and this, in the operation of said plunger, helps to prevent the ink from drying on the top walls of the plunger and on the walls of the chamber $a^5$ and thus interfering with the movement of the plunger, but this tapering of the top walls of the plunger $b$ is not absolutely essential and said walls of the said plunger may be of the same transverse dimensions throughout its length if desired, and it will also be understood that in the operation of the plunger a thin film of ink is formed between the walls thereof and the walls of the chamber $a^5$ and this keeps said plunger thoroughly lubricated at all times.

While I have described the preferred method of operating my improved inkstand, it will be understood that sufficient ink may be poured into the well or into the chamber $a^5$ through the tube $b^3$ of the plunger $b$ to raise said plunger above the position shown in Fig. 2, without materially interfering with the inking of a pen which must always be inserted into the plunger, but in practice, I prefer the method of operation hereinbefore described in which only sufficient ink is poured into the well to raise the plunger to the position shown in Fig. 2, as this facilitates the insertion of the pen and the depressing of the plunger, as shown in Fig. 3. It will also be understood that the plunger $b$ is removable and may be withdrawn from the body $a^2$ of the receiver or well whenever desired for cleaning or other purposes.

By using the cap or closure device $c$ shown in Fig. 1, my improved inkstand may be securely closed and may thus be carried in the pocket, a hand bag, or in any other way, but this invention is not limited to the use of said closure cap and if desired the funnel or cup-shaped top $a^4$ of the body portion of the receiver or well may be made as shown in Fig. 3, and a slip cap or other closure device may be employed if desired, or said inkstand may be used without a cap or closure device.

In the construction shown in Fig. 1, the bottom of the tube $b^3$ of the plunger float extends a little below the bottom of the side walls of said float and said tube is provided in the bottom thereof with radial notches or recesses $b^7$ to permit the ink to flow from said tube into the chamber $b^4$, but this construction is not absolutely necessary and transverse grooves may be provided in the bottom of the chamber $a^5$, or any suitable construction may be employed to permit the ink to flow from the tube $b^3$ into the chamber $b^4$ in the operation of pouring in the ink as hereinbefore described. The extension of the tube $b^3$ below the bottom of the outer walls of the plunger $b$, as shown in Fig. 1, also operates to facilitate the action of said plunger as it prevents suction at the bottom of the plunger which would operate to hold it down, but this same result may be accomplished by providing the bottom of the chamber $a^5$ with knobs or projections $a^9$ as shown in Fig. 2, and on which the lower end of the tube $b^3$ would rest when the plunger is in its lowest position, and with this form of construction, the radial notches or recesses $b^7$ in the bottom of the tube $b^3$ will not be necessary as the knobs or projections $a^9$ on the bottom of the tube $b^3$ will hold the plunger in the desired position and also permit the ink to flow out from the tube $b^3$ into the chamber $a^5$ in the operation of pouring ink into the well, as hereinbefore described.

The use of the baffle device $g$ as herein shown and described is not limited to the form of inkstand shown, and said baffle device may be used in connection with inkstands of this class having a vertically movable plunger provided with a central tube through which the ink passes when the plunger is depressed and one of which is shown and described in the patent hereinbefore referred to, and my invention is also not limited to the exact form of the float shown and described herein and the bottom of which is open.

Having fully described my invention what I claim as new and desire to secure by Letters Patent is:—

1. An inkstand comprising a main well or receiver portion having a funnel-shaped top and a vertical cylindrical chamber into which said top opens, a vertically movable hollow cylindrical float placed in said chamber, said float being open at the bottom and provided with a cup-shaped top having a central tube which extends upwardly therethrough, and a tubular baffle device inserted into and removable from said tube and provided centrally of the top thereof with a transverse raised member.

2. An inkstand comprising a main well or receiver portion having a funnel-shaped top and a vertical cylindrical chamber into which said top opens, a vertically movable hollow cylindrical float placed in said chamber, said float being open at the bottom and provided with a cup-shaped top having a central tube which extends upwardly therethrough, and a tubular baffle device inserted into and removable from said tube and provided centrally of the top thereof with a transverse raised member, said baffle-device being vertically adjustable in said tube.

In testimony that I claim the foregoing as my invention I have signed my name in presence of the subscribing witnesses this 28th day of January 1913.

EMRY DAVIS.

Witnesses:
C. MULREANY,
S. ANDREWS.

Copies of this patent may be obtained for five cents each, by addressing the "Commissioner of Patents, Washington, D. C."